May 24, 1932.　　　　P. MATTLER　　　　1,859,570

METHOD OF PREPARING LEATHER FOR WEAVING

Filed Feb. 11, 1929

Inventor:
PETER MATTLER,
John H. Bruninga
His Attorney.

Patented May 24, 1932

1,859,570

UNITED STATES PATENT OFFICE

PETER MATTLER, OF ST. LOUIS, MISSOURI, ASSIGNOR TO JOHNSON-STEPHENS & SHINKLE SHOE COMPANY, OF ST. LOUIS, MISSOURI, A CORPORATION OF MISSOURI

METHOD OF PREPARING LEATHER FOR WEAVING

Application filed February 11, 1929. Serial No. 339,041.

This invention pertains to a method of preparing leather in strips as for the purpose of weaving such strips into a suitable web.

In the art of weaving leather, a series of narrow strips is arranged to form the warp and similar narrow strips wound upon suitable shuttles are passed through the warp in the usual manner to form the web. As leather ordinarily comes in short lengths, so that strips cut therefrom would be limited in length and frequent splicing would be necessary in order to provide a strip suitable for weaving, it is desirable to provide a method for preparing strips of considerable length wound upon suitable shuttles so as to reduce to a minimum the labor required for splicing.

One of the objects of this invention, therefore, is to provide a method for conveniently cutting sheets of leather into strips and winding the same upon shuttles.

Another object is to provide a method whereby a band of considerable length may be made up of sections of leather bands spliced together and the composite band cut into continuous strips of great length.

Another object is to provide such a method in which the strips are wound upon shuttles as they are cut from the band.

Further objects will appear from the following description, taken in connection with the accompanying drawings, in which—

Figure 1:
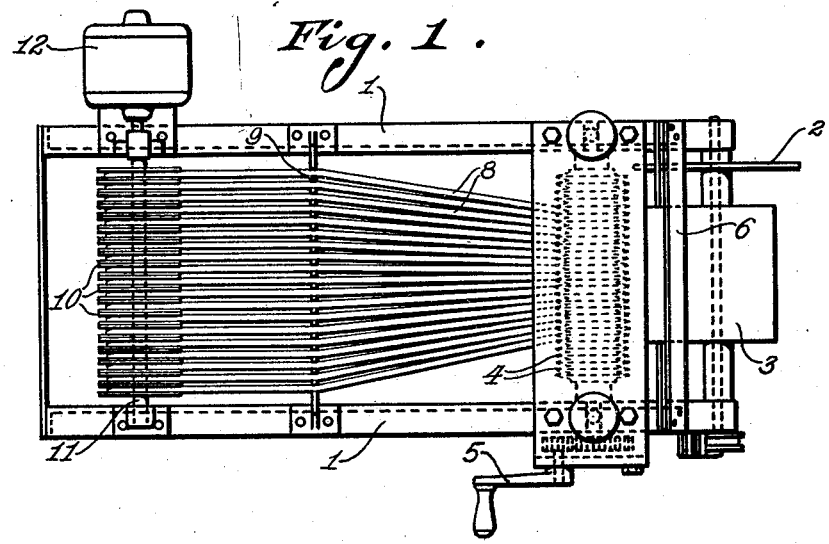
Figure 2:
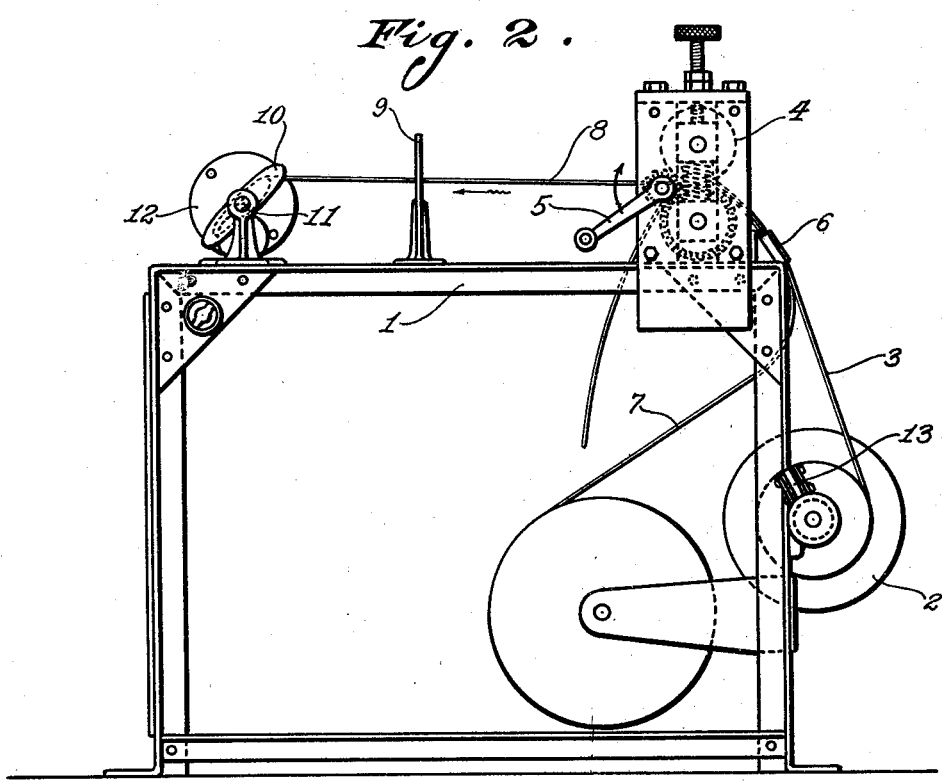

Figure 1 is a plan view of a machine embodying this invention and adapted for carrying out the method thereof; and Figure 2 is a side view of Figure 1.

In accordance with the present invention, a long band of leather is made up by splicing together a series of sections. This band is then cut into a plurality of narrow strips, which are passed directly to a series of shuttles and wound thereon. During the cutting and winding operations, the cut strips are kept under tension from the point of cutting to the winding shuttles so as to insure smooth operation of the cutting devices and, therefore, clean-cut strips, and also to insure proper winding thereof upon the shuttles.

The shuttle wound strips may then be used for weaving a web of leather strips as described in application Serial No. 349,337, filed Mar. 23, 1929. In this method a similar band, made up of a series of short sections of leather spliced together, is passed through a set of cutters to cut it into narrow strips. The cut strips are arranged to form the warp and to be separated in a suitable manner to form a shed through which the shuttle wound strips are passed. This invention is, therefore, complementary to that described in the above mentioned application and relates to the preparation of the shuttle wound strips and their application to the weaving operation.

Referring to the drawings, 1 designates a frame of any suitable type, upon which is mounted a reel 2 carrying a band 3 of leather. Before winding on the reel, the band 3 is prepared by splicing together a series of short sections to make up one long band. Mounted on the upper part of the frame 1 is a series of cutting wheels 4 connected to be operated in any suitable manner, as by a crank 5. The band 3 passes upwardly to the cutters 4 through a guide 6 on the frame.

A band 7 of backing material, such as paper or the like, may be passed through the cutters below the leather band 3 so as to insure clean cutting of the strips. The backing material 7 may, however, be omitted, if so desired.

After passing through the cutters 4, the band is subdivided into narrow strips 8, which are then passed through a suitable comb 9, so as to separate the same, and then to a series of shuttles 10 mounted on a shaft 11 arranged to be driven by a motor 12 or other suitable means.

The motor 12 may be arranged in any suitable manner to apply a constant torque to the shaft 11 so that the strips 8 will be maintained under tension and such tension will be maintained practically uniform. This may be done by winding the motor in such a way that it may be stalled without injury and arranging it to apply a continuous torque to the shaft 11, either directly or through suitable gearing. Or, it may be connected to the shaft 11 through any suitable means adapted to apply the required torque. By thus rotating the shuttles with a constant torque, the strips are maintained under tension from the shuttles clear to the cutting point at the cutters 4. The reel 2 may be provided with a suitable braking device 13 adapted to the tension. In this way, the strips and the band are passed through the cutters under tension so that the band is kept smooth, and a clean cutting operation is obtained.

It will be seen that this invention provides a simple method for preparing strips of leather for weaving. The splicing together of the separate sections of the band 3 before cutting obviates the necessity of splicing each of the strips 8 in order to produce a strip sufficiently long for weaving purposes. It is further obvious that in splicing a broad band 3, a neater and more uniform splice may be made, so as to avoid ridges in the material. Consequently, when the band is cut into strips, the strips will be of uniform width and thickness throughout, and a uniform web will result from the weaving operation.

It is obvious that various changes may be made, within the scope of the appended claims, in the details of construction and operation without departing from the spirit of this invention. It is, therefore, to be understood that this invention is not to be limited to the specific details shown and/or described.

Having thus described the invention, what is claimed is:

1. In the art of making leather strands, the method comprising, matching or squaring and splicing together successive hides or leather sections, and splitting the spliced sections into strands.

2. In the art of making leather strands, the method comprising, matching or squaring and splicing together successive hides or leather sections, splitting the spliced sections into strands, and winding the strands as they are split off.

3. In the art of making leather strands, the method comprising, matching or squaring and splicing together successive hides or leather sections, splitting the spliced sections into strands, and holding the strands under tension while they are being split off from the leather sections.

4. In the art of making leather strands, the method comprising, matching or squaring and splicing together successive hides or leather sections, splitting the spliced sections into strands, and winding the strands while they are held under tension from the points of splitting.

5. In the art of making leather strands, the method comprising, matching or squaring and splicing together successive hides or leather sections, splitting the spliced sections into strands, holding the joined leather sections under tension to the points of splitting and holding the strands under tension from the points of splitting.

In testimony whereof I affix my signature this 31st day of January, 1929.

PETER MATTLER.